April 30, 1935.  W. R. BURKHARDT  1,999,921
ORIFICE DIAPHRAGM FOR HEAD GATES
Filed Aug. 8, 1934
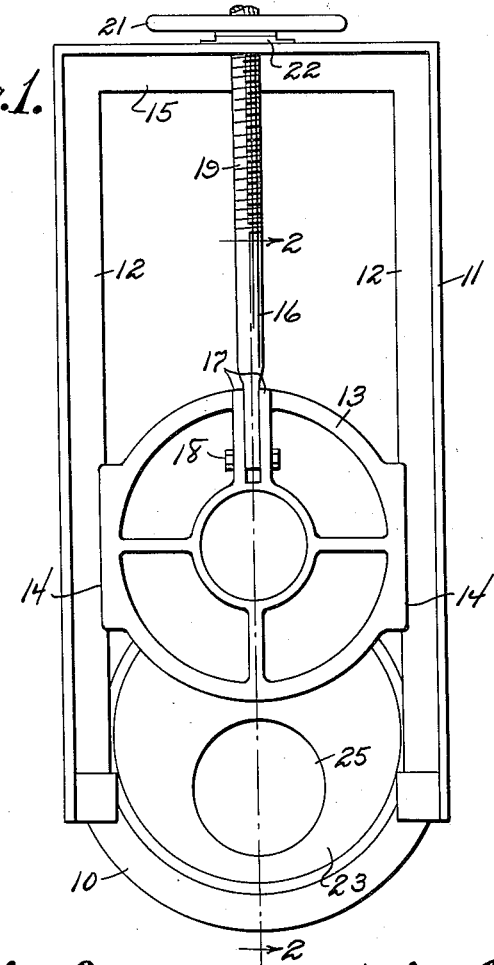
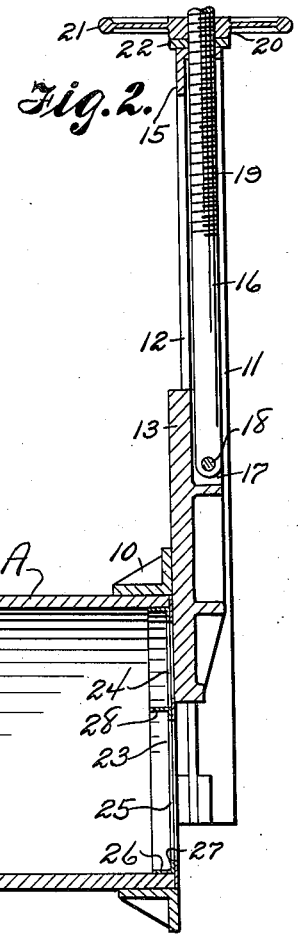
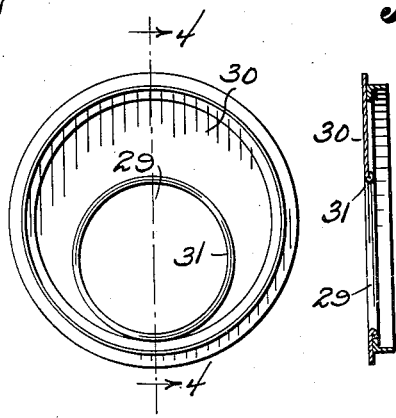
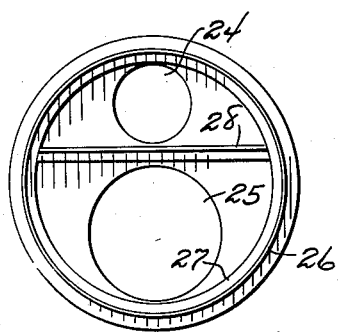
Walter R. Burkhardt
INVENTOR
BY Victor J. Evans & Co.
ATTORNEY Patented Apr. 30, 1935

1,999,921

UNITED STATES PATENT OFFICE 1,999,921

ORIFICE DIAPHRAGM FOR HEAD GATES

Walter R. Burkhardt, Bliss, Idaho

Application August 8, 1934, Serial No. 739,025

1 Claim. (Cl. 137—75)

The invention relates to irrigation head gates and more especially to orifice diaphragms for the head gates.

The primary object of the invention is the provision of a diaphragm of this character, wherein the same is constructed to become seated at the inlet end of a pipe used in irrigation and this diaphragm has provided therein a circular orifice which eliminates clogging by weeds, moss and other matter contained in irrigation water and thus assuring successful irrigation.

Another object of the invention is the provision of a diaphragm of this character, wherein the orifice or orifices provided therein have the marginal edges reinforced by presenting rolled edges thereto, while the body of the diaphragm is strengthened by reinforcement and in this manner there is avoided any lodging places for floating weeds, moss and all kinds of débris as contained in irrigation water, the head gate being cooperative with the diaphragm for regulating the flow of the water therethrough.

A further object of the invention is the provision of a diaphragm of this character which is simple in construction, thoroughly reliable and efficient in its purposes, strong, durable, adaptable for fitting with irrigation piping, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is an elevation of a head gate as applied to irrigation piping, showing the diaphragm constructed in accordance with the invention in place.

Figure 2 is a sectional view on the line 2—2 of Figure 1.

Figure 3 is a rear elevation showing a slight modification of diaphragm.

Figure 4 is a sectional view on the line 4—4 of Figure 3 looking in the direction of the arrows.

Figure 5 is a rear elevation of the diaphragm as shown in Figures 1 and 2.

Similar reference characters indicate corresponding parts throughout the several views in the drawing.

Referring to the drawing in detail, A designates generally a portion of a pipe section employed in irrigation systems and this section is adapted to constitute the inlet for water admitted to the irrigation system. Upon this pipe section A, at the inlet end, is arranged a head gate comprising a collar-like pipe section fitting 10 which is adapted to be telescoped over the end of the pipe section A and from which rises the inverted substantially U-shaped frame 11, the side pieces of which constitute guide flanges 12 for the circular-shaped gate 13 proper. This gate 13, at opposite sides projected laterally from the outer periphery, has formed therewith the runners 14 slidably engaging the flanges 12 of the frame 11.

Medially of the head end 15 of the frame 11 is fitted an adjusting stem 16 which, at the lower portion thereof, fits between pivot ears 17 on the gate 13 proper and these ears carry a pivot bolt 18 connecting the lower end of the stem 16 to said gate proper. The stem 16 at its upper portion is threaded, as at 19, for the companion fitting in the hub 20 of a turning wheel 21 which has its bearing upon a bearing plate 22 on the head end 15 of the frame 11, the wheel 21 being manually turned for the shifting of the gate 13 proper to regulate the flow of irrigation water into the pipe section A.

Adapted to be fitted within the inlet end of the pipe section A is an orifice diaphragm comprising a circular-shaped or disk-like body 23 having the several orifices 24 and 25, respectively, the orifice 25 being of considerably greater size than the orifice 24 and below the latter. This body 23 at its peripheral portion confronts the end of the pipe section A and is of a diameter alike to the external diameter of said pipe section to become seated against the said end thereof. On the inner face of the body 23 is an annular ring 26 having the inturned flange 27 interfitted about the same and this flange is made fast to the inner face of the body 23 throughout the extent thereof, the ring 26 being inset to the outer periphery of the body 23 and adapted to fit within the pipe section A, so that the latter will be telescoped over this ring, while the outer face of the body 23 lies flush with the outer surface of the fitting 10 and the gate 13 proper is adapted to move over the body 23 for controlling the respective orifices 24 and 25 therein, these being circular in shape, and thus the liability of weeds, moss and all kinds of débris clinging within the orifices is entirely eliminated and the clogging of the pipe section and the orifices is avoided. Disposed transversely between the orifices 24 and 25 upon the inner face of the body 23 is an angle reinforcing piece 28 which meets at its opposite ends the flange 27 of the ring 26 and thus this body 23 of the diaphragm is materially reinforced to withstand the pressure of the water and severe usage of such diaphragm.

In Figures 3 and 4 of the drawing there is shown a slight modification of diaphragm wherein the orifice 29 in the body 30 of such diaphragm has its peripheral edge inwardly rolled, as at 31, and thus materially strengthening such edge without presentation of lodging places for floating weeds, moss or other debris as contained in the irrigation water to choke the flow thereof through the orifice in the diaphragm.

The manner of use of the diaphragm and the construction thereof should be clearly understood from the foregoing description and the illustration in the drawing, so a more expended explanation has been omitted.

It is, of course, understood that the sizes of the orifices in the diaphragm may be varied according to the capacity required for irrigation purposes, while the head gate regulates the flow of the irrigation water for entrance into the pipe section of the irrigation system.

What is claimed is:

A diaphragm of the character described comprising a disk like body having a circular orifice therein at one side of its center, a ring like member of less diameter than the body and fitted to one side thereof to provide an annular flange with the edge of the disk concentric to said flange and an angle reinforcing piece within the ring like member meeting at opposite ends the flange and disposed transversely of the disk for contact therewith.

WALTER R. BURKHARDT.